United States Patent
Saitoh et al.

(10) Patent No.: US 6,866,601 B2
(45) Date of Patent: Mar. 15, 2005

(54) RATCHET-TYPE HYDRAULIC TENSIONER

(75) Inventors: Toyonaga Saitoh, Osaka (JP); Tatsuya Konishi, Osaka (JP); Junya Kurohata, Osaka (JP); Shigekazu Fukuda, Osaka (JP); Hiroshi Hashimoto, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 104 days.

(21) Appl. No.: 10/334,558

(22) Filed: Dec. 30, 2002

(65) Prior Publication Data

US 2003/0134703 A1 Jul. 17, 2003

(30) Foreign Application Priority Data

Jan. 11, 2002 (JP) ....................................... 2002/004266

(51) Int. Cl.[7] .............................................. F16H 7/08
(52) U.S. Cl. ....................................... 474/109; 474/110
(58) Field of Search ........................ 474/109–111, 140, 474/133–135

(56) References Cited

U.S. PATENT DOCUMENTS

| 5,259,820 | A | | 11/1993 | Mott | |
|---|---|---|---|---|---|
| 5,277,664 | A | | 1/1994 | Mott | |
| 5,346,436 | A | * | 9/1994 | Hunter et al. | 474/110 |
| 5,366,415 | A | * | 11/1994 | Church et al. | 474/110 |
| 6,045,471 | A | * | 4/2000 | Suzuki | 474/109 |
| 6,086,497 | A | * | 7/2000 | Fukuda et al. | 474/110 |
| 6,383,103 | B1 | * | 5/2002 | Fujimoto et al. | 474/110 |
| 6,592,479 | B2 | * | 7/2003 | Nakakubo et al. | 474/109 |
| 6,695,730 | B2 | * | 2/2004 | Amano et al. | 474/101 |

FOREIGN PATENT DOCUMENTS

| JP | 63-68550 | 5/1988 |
|---|---|---|
| JP | 02-225848 | 9/1990 |
| JP | 3-85739 | 8/1991 |
| JP | 2001-208150 | 8/2001 |

* cited by examiner

Primary Examiner—Marcus Charles
(74) Attorney, Agent, or Firm—Howson and Howson

(57) ABSTRACT

In a ratchet-type hydraulic tensioner for a chain transmission, having a plunger and a housing forming a high pressure oil chamber, an excess supply oil discharge passage is provided. The discharge passage communicates with an oil supply passage leading from an oil supply opening, which receives oil under pressure from a oil pump, to a hydraulic check valve mechanism in the housing, which delivers oil to the high pressure oil chamber. Excess oil is discharged to the exterior of the tensioner housing and directed toward the chain. Excessive chain tension is avoided, and smooth and reliable chain travel, and suppression of whistling sounds, are achieved.

1 Claim, 10 Drawing Sheets

RATCHET-TYPE HYDRAULIC TENSIONER

CROSS REFERENCE TO RELATED APPLICATIONS

This application claims priority from Japanese patent application 004266/2002, filed Jan. 11, 2002.

FIELD OF THE INVENTION

This invention relates to a tensioner used for applying proper tension to a belt or chain, such as the timing belt or chain in a vehicle engine. It relates more specifically to a hydraulic tensioner in which a ratchet locking mechanism and a hydraulic valve mechanism are combined.

BACKGROUND OF THE INVENTION

Tensioners are widely used to suppress vibration generated during the operation of a timing belt or timing chain, which transmits rotation between the crankshaft and camshaft of an internal combustion engine. The tensioner is used not only to suppresses vibration, but also to maintain proper tension in the belt or chain. In a typical tensioner configuration, a plunger, which protrudes from a tensioner housing, presses on one side of a tensioner lever near an end of the lever which is pivotally mounted on an engine housing. A shoe surface, on the opposite side of the lever, is held in sliding contact with, and maintains tension, in the slack side of the chain, which is the side moving toward the driven sprocket.

FIGS. 10 and 11 show a conventional ratchet-type hydraulic tensioner 50, which includes a ratchet locking mechanism 53. This conventional tensioner is disclosed in the specification of Japanese patent application No. 013068/2000. This tensioner comprises a plunger 51 slidable in, and protruding from, a housing 52, and biased in the protruding direction by a spring 56. A ratchet pawl 53a is pivotally supported on the tensioner housing 52. The ratchet pawl is accommodated in a recess constituted by a groove 52e formed between side walls 52d of the housing 52 and is biased by a ratchet pawl spring 53c in such a way that the ratchet mechanism blocks retracting movement of the plunger 51 by causing teeth 53d of the ratchet pawl 53a to engage ratchet teeth 51a provided on the outer periphery of the plunger 51 on one side thereof.

The tensioner 50 further includes a hydraulic check valve mechanism 55, through which oil, supplied under high pressure by an oil pump activated by the engine, is fed to a high pressure oil chamber 54 inside the plunger 51.

In the ratchet-type hydraulic tensioner 50, the teeth 53d of the pawl engage the ratchet teeth 51a. When the plunger 51 receives an impact force from the tensioner lever, the plunger 51 moves, in the retracting direction, against the biasing force exerted by spring 56. A limited amount of retracting movement is permitted, within the range of backlash of the ratchet teeth 51a and the pawl teeth 53d. Retracting movement of the plunger causes the hydraulic valve mechanism 55 to close. Then, oil in the high-pressure oil chamber 54 in the plunger 51 absorbs the impact force from the tensioner lever by leaking through the clearance between the outer peripheral surface of the plunger 51 and the inner peripheral surface of the plunger-receiving hole.

Although not illustrated, when rate at which oil is supplied to the tensioner 50 by an oil pump increases rapidly, an excessive amount of oil can be fed to the high-pressure oil chamber 54, causing the plunger 51 to protrude farther than necessary. In particular, when a cold engine is started, the oil supplied by the engine oil pump has a high viscosity. Because of the high viscosity, the oil pressure in the high-pressure oil chamber 54 can be higher than usual, and, as a result, the plunger 51 can be pushed outwardly toward the tensioner lever farther than necessary. In the case of the conventional ratchet-type hydraulic tensioner 50, engagement of the pawl teeth with the ratchet teeth prevents the plunger from returning easily into the tensioner housing 52.

As a result of excess pressure and high viscosity of the oil, the plunger may exert excessive pressure on the tensioner lever, resulting in abnormally high tension in a timing chain. This has resulted in problems, including the generation of a whistling sound and premature breakage of the timing chain.

Accordingly, objects of the invention are to solve the above-mentioned problems encountered in the operation of conventional ratchet-type hydraulic tensioners, and to provide a ratchet-type hydraulic tensioner in which, when excessive oil is supplied by an oil pressure generating source such as an oil pump or the like, the excess oil, in an oil supply passage leading from an oil supply opening to an hydraulic valve mechanism, is discharged to the exterior of the tensioner in order to prevent an excessive amount from being supplied to the plunger. In this way, abnormal protrusion of the plunger is prevented, the whistling sound of the chain is reduced, proper tension is maintained in the chain, so that the chain travels reliably and smoothly, and the durability of the tensioner, and the chain and other components with which the tensioner cooperates, is improved.

SUMMARY OF THE INVENTION

The ratchet-type hydraulic tensioner according to this invention comprises a housing having a plunger-receiving hole, and a plunger disposed in the plunger-receiving hole, the plunger being movable in the hole in a protruding and retracting direction. The plunger is spring-biased in the protruding direction, so that the plunger can apply tension to a traveling chain. The plunger and the plunger-receiving hole together define a high pressure oil chamber. The tensioner also includes a ratchet locking mechanism comprising a ratchet pawl pivotally supported on the housing and ratchet teeth provided on the plunger and engageable by the pawl. An oil supply opening is provided for receiving oil fed under pressure from a source such as an oil pump, and a hydraulic valve mechanism is in fluid communication, through an oil supply passage, with the oil supply opening. The hydraulic valve mechanism allows oil to flow into the high-pressure oil chamber but blocks backflow of oil from the high pressure oil chamber through the oil supply passage. The improvement comprises a discharge passage for excess supply oil, providing fluid communication from the oil supply passage to the exterior of said housing. Preferably, the discharge passage is arranged to direct a spout of oil toward the chain to provide auxiliary lubrication to the chain.

The oil discharge passage may have its discharge opening at any location, but the location of the opening and the direction of discharge of excess oil are preferably selected by taking into account the mounting position of the tensioner relative to the tensioner lever, so that the discharged excess oil will be directed toward the chain.

When excess oil is supplied under pressure from a source such as an oil pump or the like, the excess oil is discharged to the outside of the tensioner before reaching the high-pressure oil chamber. Therefore, excess supply of oil into high pressure chamber is avoided, chain tension is maintained at a proper level, reliable and smooth travel of the chain is realized, and the whistling noise produced by a chain when under excessive tension is avoided.

DETAILED DESCRIPTION OF THE PREFERRED EMBODIMENTS

Figure 1A:
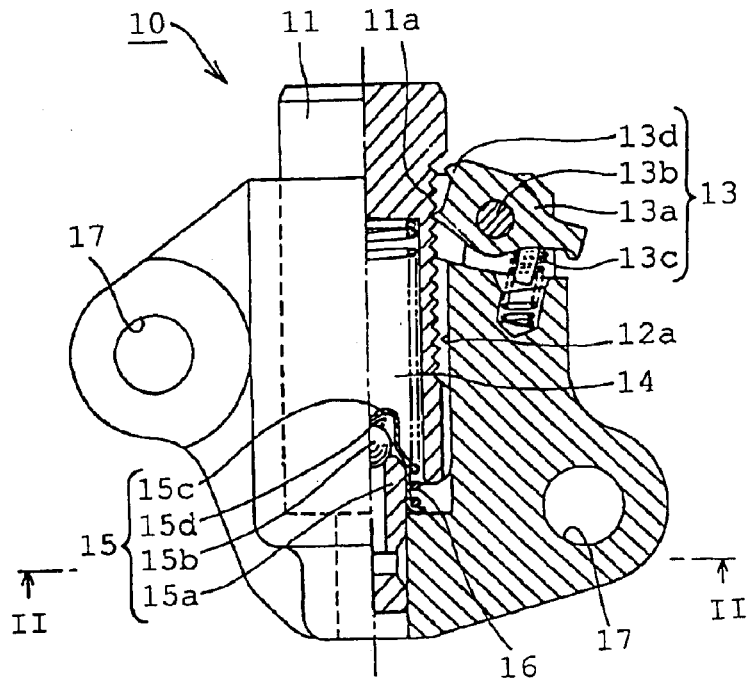
FIGS. 1(a), 1(b) and 1(c) are respectively front, side and back views, partly in section, of a ratchet-type hydraulic tensioner in accordance with a first embodiment of the invention.

Preferred embodiments of a ratchet-type hydraulic tensioner according to the invention will now be described with reference to the drawings.

The ratchet-type hydraulic tensioner 10 of the first embodiment, shown in FIGS. 1(a) to 3, comprises a plunger 11 spring-biased by a spring 16 in the protruding direction from a housing. The housing includes a plunger-receiving hole 12a, into which the plunger 11 fits. The plunger is slidable in the hole 12a in the protruding and retracting directions. An oil supply opening 12b (FIGS. 1(c) and 2) is provided in the housing 12 for supplying oil under pressure from a hydraulic generating source such an oil pump or the like. The tensioner also comprises a ratchet locking mechanism 13, in which a ratchet pawl 13a, pivotally supported on the housing, engages with ratchet teeth 11a provided on one side surface of the outer periphery of the plunger 11. Within the housing, a hydraulic check valve mechanism 15 allows oil, fed under pressure through the oil supply opening 12b, to flow to a high-pressure oil chamber 14 formed between the plunger receiving hole 12a and the plunger 11, but blocks backflow of the oil. A mounting hole 17 is provided for mounting the ratchet-type hydraulic tensioner 10 on an engine.

The pawl 13a of the ratchet locking mechanism 13 is pivotally supported on a shaft 13b and is biased by a spring 13c. Retracting movement of the plunger 11 is blocked by engagement of teeth 13d, formed on the ratchet pawl 13a, with ratchet teeth 11a.

The hydraulic valve mechanism 15 comprises a ball seat 15a, press-fit into the tensioner housing 12, a check ball 15b, which can freely abut the ball seat 15a, a retainer 15c, which retains the check ball, and a spring 15d, which biases the check ball 15b toward the ball seat 15a. The spring-biased check ball 15b allows flow of oil into the high-pressure oil chamber 14, but blocks backflow of oil from the high-pressure oil chamber 14.

The tensioner 10 has a backlash between the ratchet teeth 11a and the pawl teeth 13d. When the plunger 11 receives impact from a tensioner lever, the plunger 11 moves in the retracting direction against the biasing force exerted by the plunger spring 16. The range of retracting movement of the plunger depends on the backlash of the ratchet mechanism, and occurs while the hydraulic valve mechanism 15 is closed. Oil leaks from within the plunger 11 between the outer peripheral surface of the plunger 11 and the inner peripheral surface of the plunger receiving hole 12a in the housing 12, thereby exhibiting a damping action, absorbing the impact force.

As a timing chain stretches during operation, the plunger 11 protruded as a result of the force exerted on it by the plunger spring 16. Oil is supplied to the interior of the housing, and at the same time, the engagement between the ratchet teeth 11a of the plunger 11 and the pawl teeth 13d is shifted by one tooth. The plunger 11 always follows the stretching of the timing chain, functioning as a one-way mechanism, taking up slack.

Figure 1B:
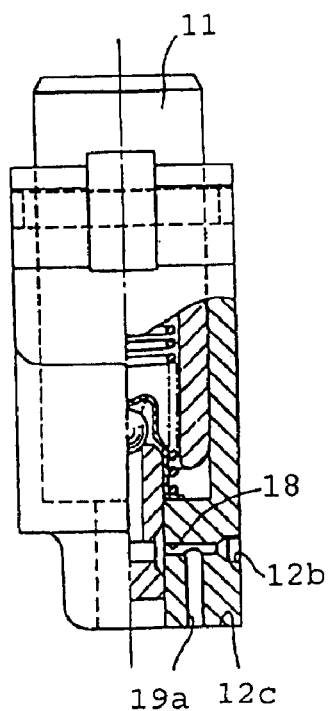
Figure 1C:
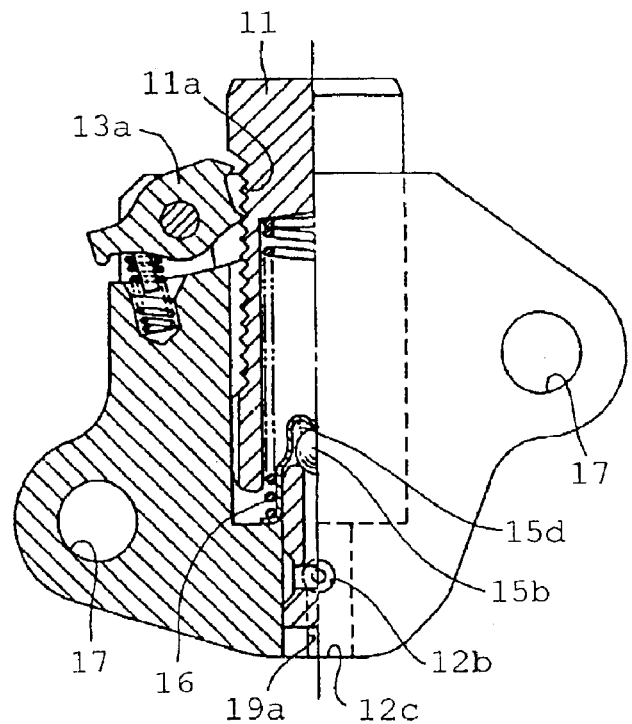
Figure 2:
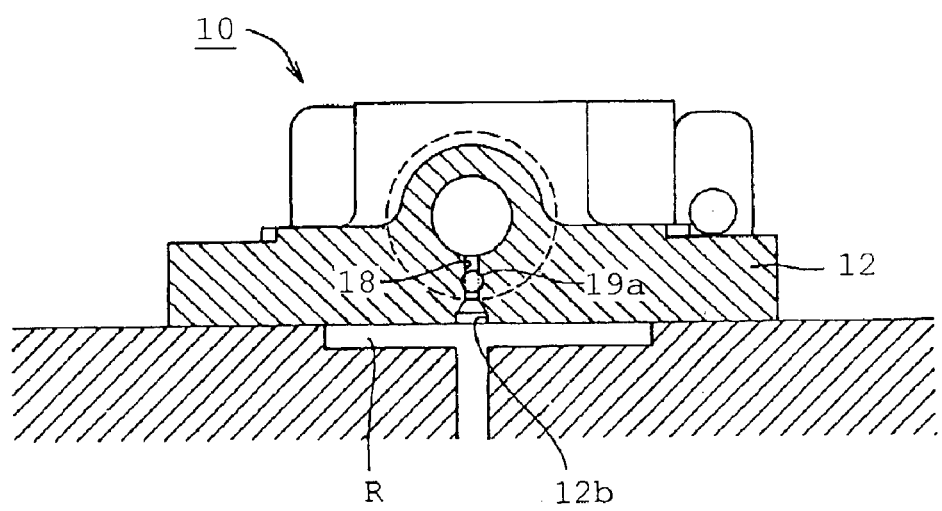
FIG. 2 is a cross-sectional view taken on plane II—II in FIG. 1(a)

A characteristic feature of the ratchet-type hydraulic tensioner shown in FIGS. 1(a)–2 is the arrangement of oil passages. As shown in FIG. 1(b), an oil supply passage 18 extends through the housing from the oil supply opening 12b on one side of the housing to the hydraulic valve mechanism 15 for feeding oil under pressure from a source such as an oil pump or the like. An excess oil discharge passage 19a, is connected to, and diverges from, passage 18 to discharge excess supply oil to the outside of the housing through a rear end surface 12c of the housing.

Figure 3:
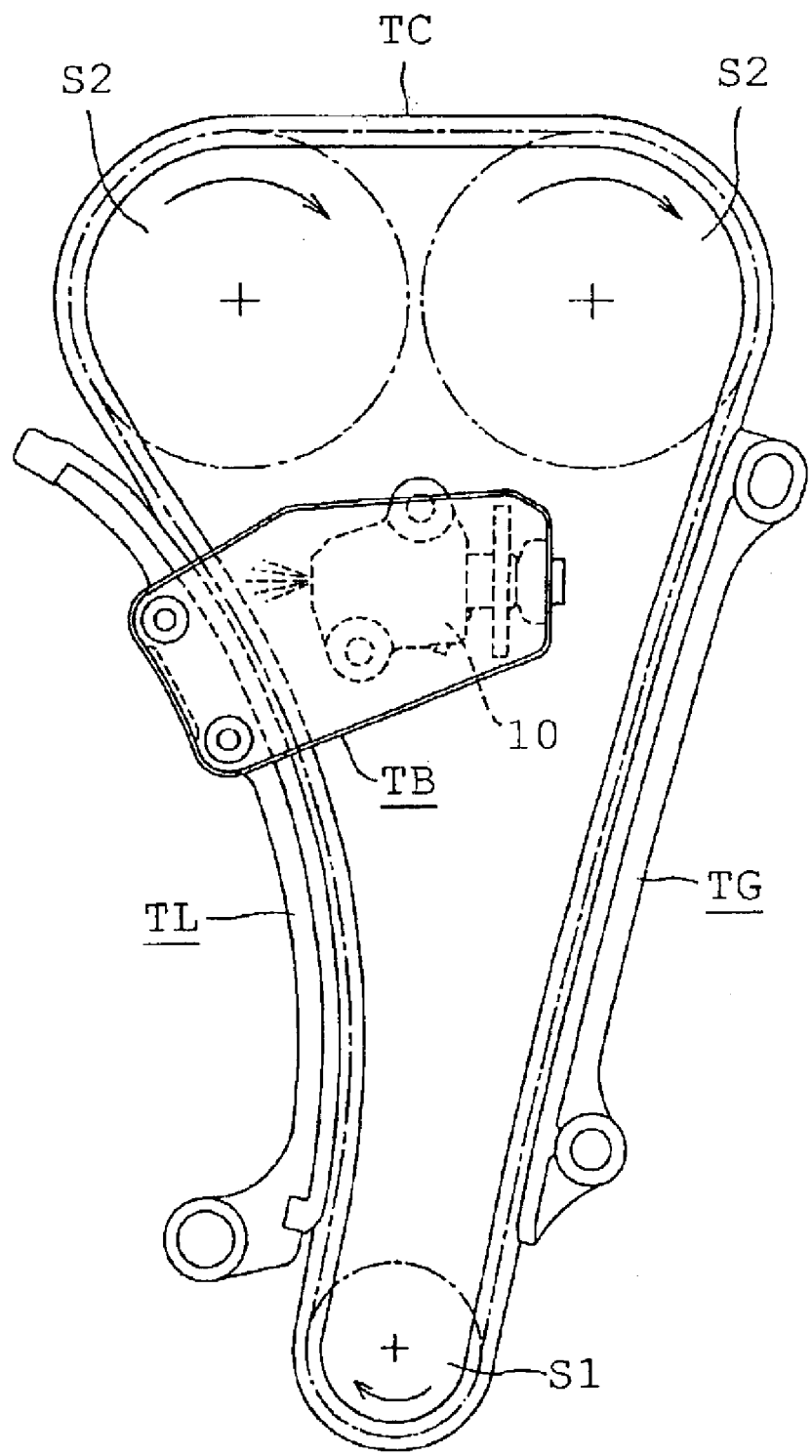
FIG. 3 is an elevational view of a timing mechanism, illustrating an application of the ratchet-type hydraulic tensioner shown in FIG. 1.

The tensioner 10 may be disposed inside the loop of the chain, as shown in FIG. 3, and connected to a tensioner lever TL by a linkage comprising bracket TB so that protruding movement of the plunger of the tensioner exerts a pulling force on the lever, pressing the lever against the chain TC and thereby maintaining tension in the chain. When the tensioner 10 is arranged as shown in FIG. 3, excess supply oil is discharged through the excess supply oil discharge passage 19a as a spout, directed toward the timing chain, so that the timing chain is further lubricated by the oil discharged from the tensioner.

As shown in FIG. 2, an oil reservoir R is provided on an side wall of the engine block for storing oil supplied by the oil oil pump or the like. This reservoir is in communication with the oil supply opening 12b of the tensioner housing 12.

When excessive oil is supplied from an oil pump or the like, the excess oil in oil supply passage 18 is discharged to the outside of the tensioner without flowing to the high-pressure oil chamber 14. Accordingly, the whistling sound caused by excessive tension in the chain is reduced, and proper tension is maintained in the chain so that reliable and smooth travel of the chain is realized. As a result, the durability of the tensioner and its associated components, such as the tensioner lever, the timing chain, and the like, is significantly improved. Furthermore, a spout of excess supply coil is discharged toward the timing chain through the excess supply oil discharge passage 19a, so that smooth travel of the timing chain is facilitated.

FIGS. 4(a) to 4(c) and 5 show a ratchet-type hydraulic tensioner 20 in accordance with a second embodiment of the invention. This tensioner comprises, as in the above-described first embodiment, a plunger 21 spring-biased in the protruding direction, and a housing 22, including a plunger receiving hole 22a into which the plunger 21 is fitted for protruding and retracting movement. Oil is supplied under pressure through an oil supply opening 22b from an oil pump or the like. The tensioner also comprises a ratchet locking mechanism 23 in which a ratchet pawl 23a is pivotally supported on the housing 22 and engages with ratchet teeth 21a provided on one side of the outer periphery of the plunger 21. A hydraulic valve mechanism 25, allows oil fed through the oil supply opening 22b to flow to a high-pressure oil chamber 24 formed between the plunger receiving hole 22a and the plunger 21, but blocks backflow of oil.

Figure 4A:
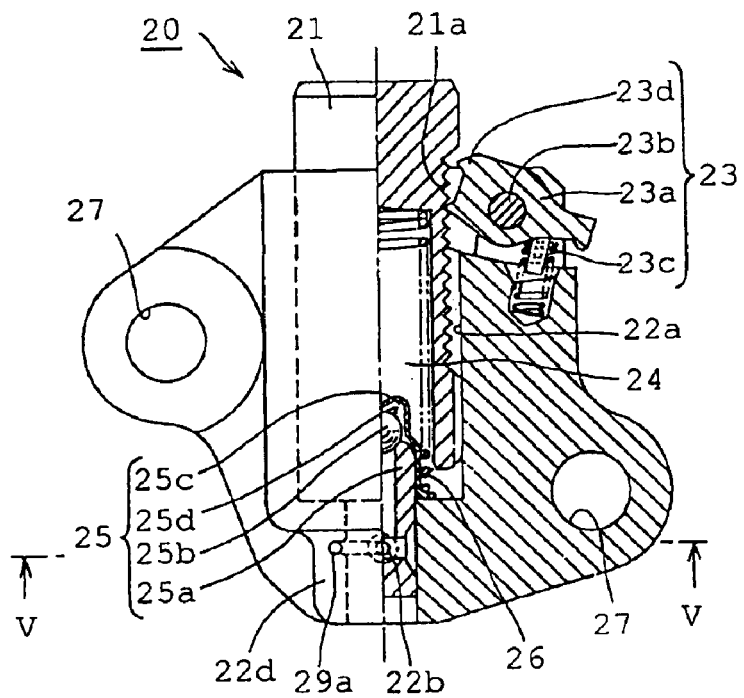
FIGS. 4(a), 4(b) and 4(c) are respectively front, side and back views, partly in section, of a ratchet-type hydraulic tensioner in accordance with a second embodiment of the invention.
Figure 4B:
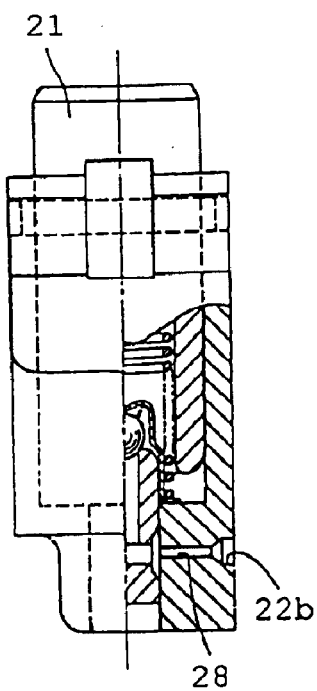
Figure 4C:
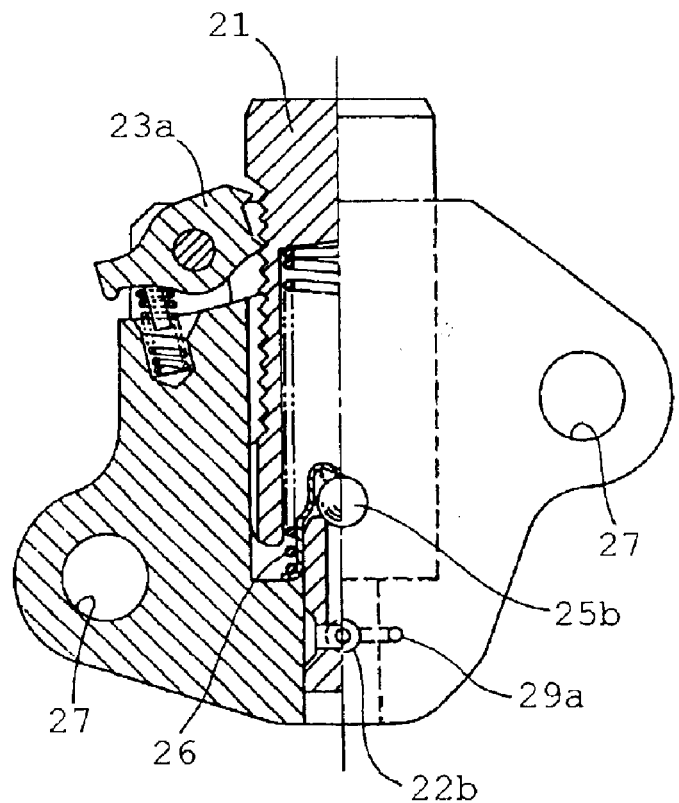
Figure 5:
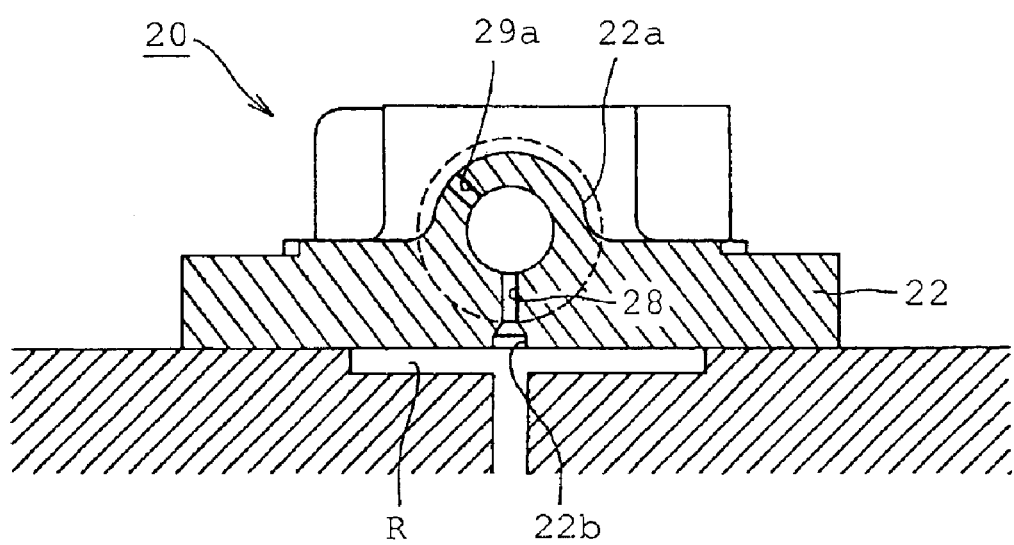
FIG. 5 is a cross-sectional view taken on plane V—V in FIG. 4(a)
Figure 6A:
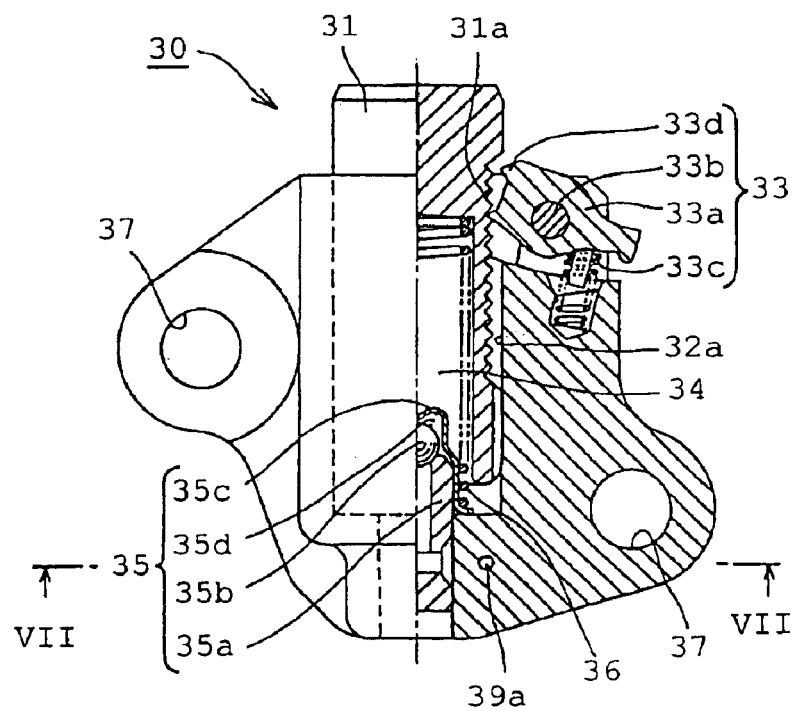
FIGS. 6(a), 6(b) and 6(c) are respectively front, side and back views, partly in section, of a ratchet-type hydraulic tensioner in accordance with a third embodiment of the invention.
Figure 6B:
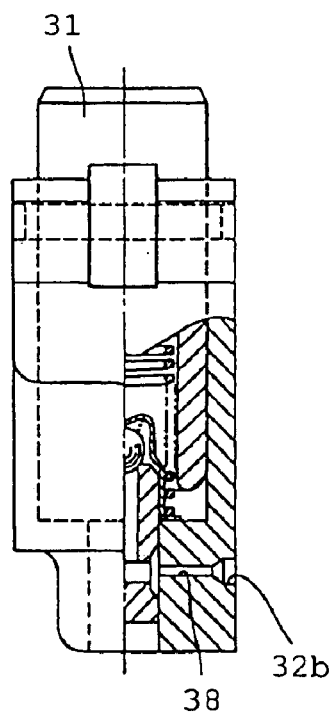
Figure 6C:
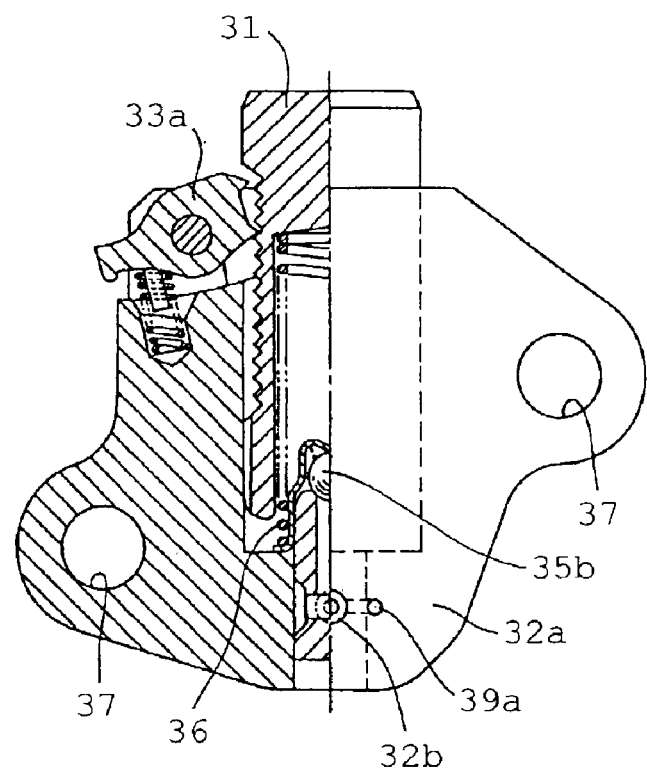

The tensioner of the second embodiment is similar to the tensioner of the first embodiment, except that excess supply oil is discharged through a discharge passage 29a (FIGS. 4(a), 4(c) and 5), which discharges excess supply oil to the outer surface 22d of the tensioner body 22 through an outer peripheral portion of ball seat 25a in the hydraulic valve mechanism 25. Thus, the interior of the ball seat 25a communicates with the oil supply passage 28, but excess oil is discharged from the interior of the ball seat without being fed to the high-pressure oil chamber 24. Here, as in the case of the first embodiment, the whistling sound caused by excess chain tension is reduced, and proper tension is maintained in the chain so that reliable and smooth travel of the chain is realized. The durability of the tensioner and its associated components such as the tensioner lever, the timing chain and the like, is significantly improved. Here again, if the tensioner is appropriately positioned, the excess tensioner supply oil discharged through passage 29a can be directed as a spout toward the timing chain to enhance lubrication of the chain and ensure smooth operation thereof.

FIGS. 6(a) to 6(c) and 7 show the ratchet-type hydraulic tensioner 30 in accordance with a third embodiment of the invention.

Figure 7:
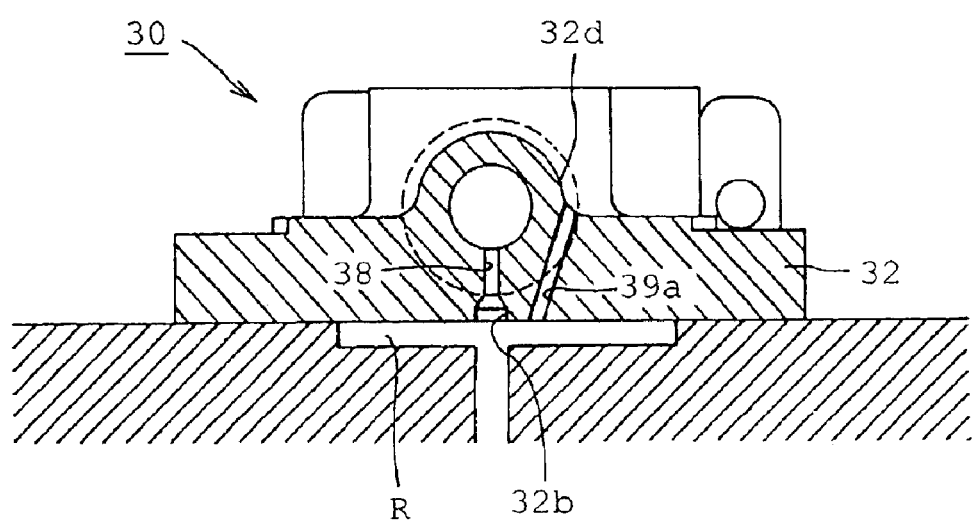
FIG. 7 is a cross-sectional view taken on plane VII—VII in FIG. 6(a)

As in the above-described first and second embodiments, the tensioner 30 comprises a spring-biased plunger 31, and a housing 32 having a plunger-receiving hole 32a into which the plunger 31 is fitted for protruding and retracting movement. An oil supply opening 32b is provided in the housing for supplying oil under pressure from a source such an oil pump or the like. The tensioner also comprises a ratchet locking mechanism 33, in which a ratchet pawl 33a, pivotally supported on the housing 32, engages with ratchet teeth 31a provided on one side of the outer periphery of the plunger 31. A hydraulic valve mechanism 35 allows oil fed through the oil supply opening 32b to flow to a high-pressure oil chamber 34 formed by the plunger receiving hole 32a and the plunger 31, but block backflow of oil. As shown in FIG. 7, an oil reservoir R is provided on a side of an engine block for storing oil supplied under pressure by an oil pump or the like. The tensioner is mounted so that its oil supply opening 32b is in fluid communication with the reservoir R.

In the housing 32, an oil supply passage 38 connects the oil supply opening 32b to the hydraulic valve mechanism 35 for feeding oil under pressure to the hydraulic valve mechanism.

Thus, the tensioner of the third embodiment is similar to those of the first and second embodiments. It differs from the first and second embodiments in that a discharge passage 39a extends through the tensioner housing from a location adjacent oil supply opening 32b, to the outer surface 32d of the tensioner body 32.

When excessive supply oil is supplied by an oil pump or the like, the excess supply oil is discharged to the outside of the tensioner without entering the high-pressure oil chamber 34. Here as in the previously described embodiments, the whistling sound caused by excess chain tension is reduced, and proper tension is maintained in the chain so that reliable and smooth travel of the chain is realized. As a result, the durability of tensioner, and its associated components parts such as a tensioner lever, timing chain, and the like, are significantly improved. Furthermore, excess supply oil can be discharged through passage 39a in the form of a spout to enhance lubrication of the timing chain.

FIGS. 8(a) to 8(c) and 9 show a ratchet-type hydraulic tensioner 40 in accordance with a fourth embodiment of the invention. As in the previously described embodiments, the tensioner 40 comprises a spring-biased plunger 41 fitted into a plunger-receiving hole 42a for protruding and retracting movement. An oil supply opening 42b supplies oil under pressure from an oil pump or the like. The tensioner includes a ratchet locking mechanism 43, in which a ratchet pawl 43a, pivotally supported on the housing 42, engages with ratchet teeth 41a provided on one side of the outer periphery of the plunger 41. A hydraulic valve mechanism 45 allows oil to flow through the oil supply opening 42b to a high-pressure oil chamber 44 formed between the plunger-receiving hole 42a and the plunger 41, but blocks backflow of oil. An oil supply passage 48 leads from the oil supply opening 42b to the hydraulic valve mechanism 45 for feeding oil from an oil pump or the like through the valve mechanism to the high pressure chamber 44.

The tensioner of this fourth embodiment is similar to the tensioners of the first, second and third embodiments. However, in this embodiment, as shown in FIGS. 8(b) and 9, an oil reservoir 42d is formed on the exterior of the tensioner housing surrounding the oil supply opening 42b, so that, when the tensioner is mounted on an engine block, with the reservoir in fluid communication with a passage in the engine block leading from an oil pump, the reservoir can store oil supplied by the oil pump.

Figure 8A:
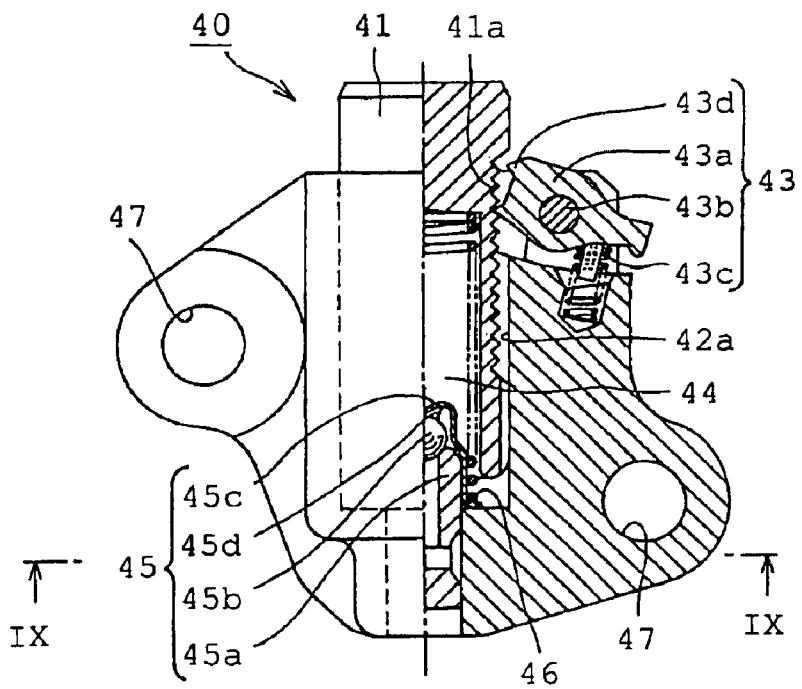
FIGS. 8(a), 8(b) and 8(c) are respectively front, side and back views, partly in section, of a ratchet-type hydraulic tensioner in accordance with a fourth embodiment of the invention.
Figure 8B:
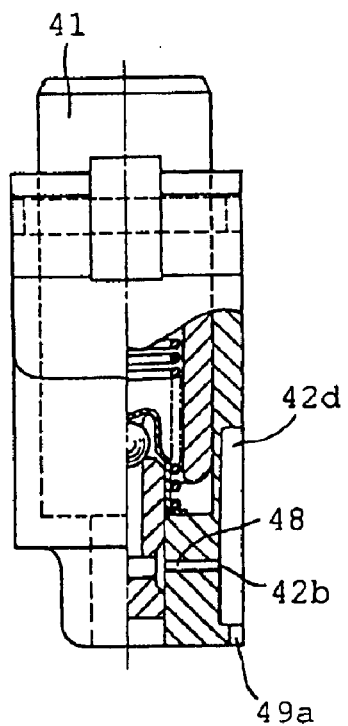
Figure 8C:
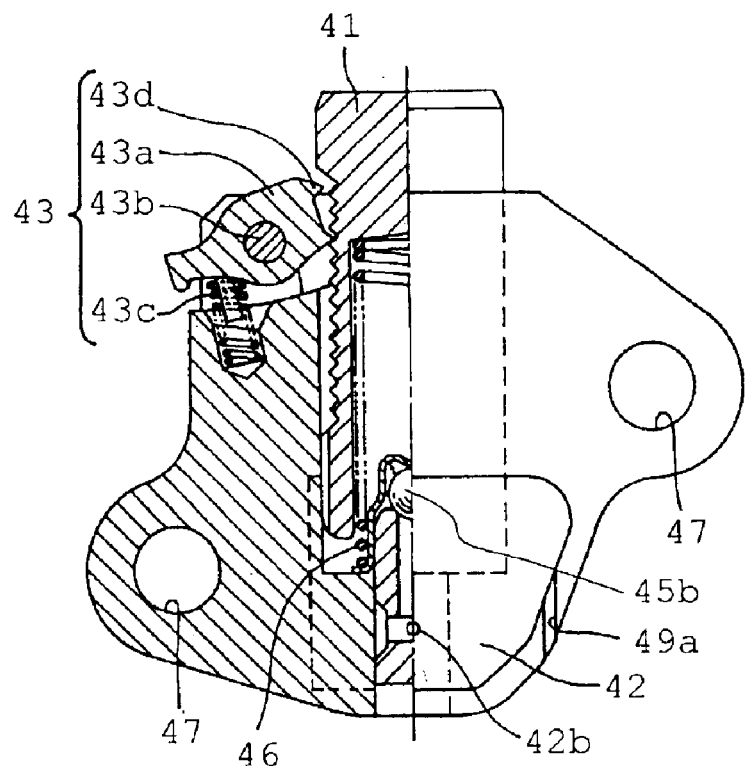
Figure 9:
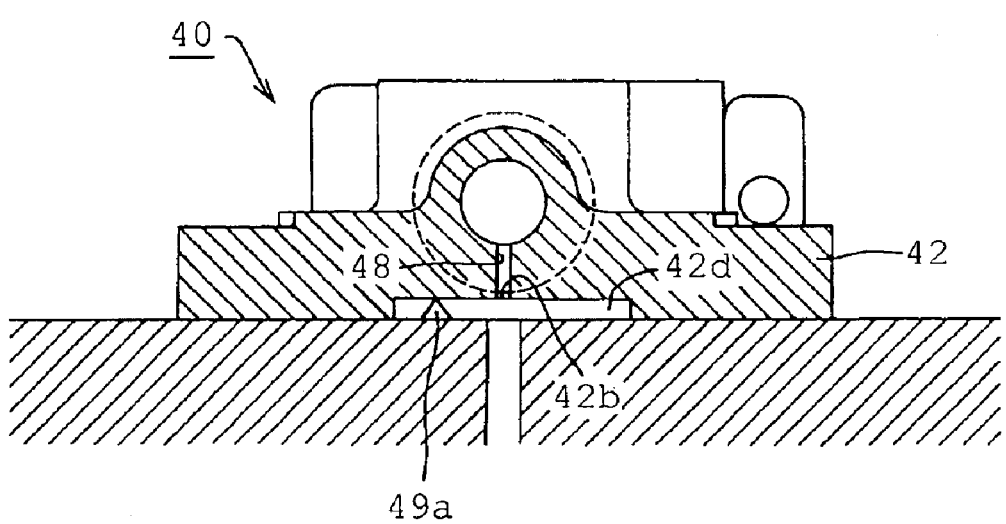
FIG. 9 is a cross-sectional view taken on plane IX–IX in FIG. 8(a)
Figure 10:
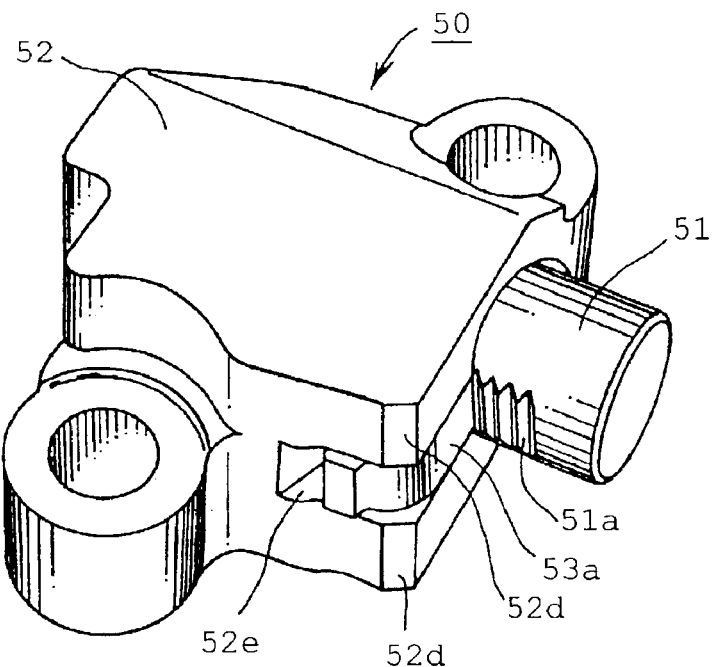
FIG. 10 is a perspective view of a conventional ratchet-type hydraulic tensioner.
Figure 11:
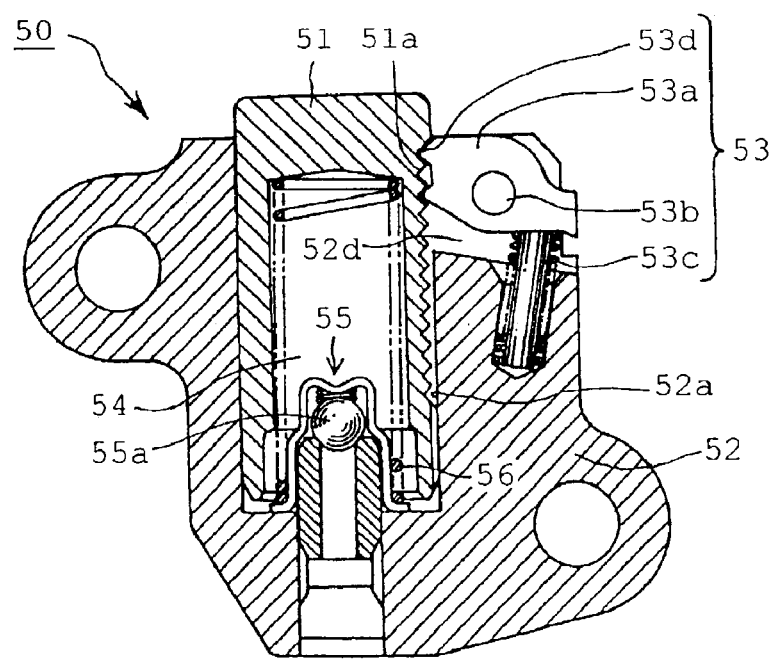
FIG. 11 is a front cross-sectional view of the conventional ratchet-type hydraulic tensioner.

As shown in FIG. 8(b), an excess supply oil discharge passage 49a is formed in the housing at an end of the reservoir 42d adjacent the rearward end of the tensioner housing. This passage discharges excess supply oil in the rearward direction as a spout of oil.

When excessive supply oil from an oil pump or the like is supplied to passage 48, the excess oil is discharged to the outside the tensioner without reaching the high-pressure oil chamber 44. Whistling sounds due to excessive chain tension are reduced, and proper tension is maintained in the chain so that reliable and smooth travel of the chain is realized.

The durability of the tensioner and its associated components such as a tensioner lever, the timing chain and the like is significantly improved. Furthermore, the excess supply oil, discharged as a spout through passage 49a, can be directed toward the timing chain to enhance the lubrication of the chain and thereby ensure smooth travel of the chain.

The ratchet-type hydraulic tensioner according to the invention exhibits several unique effects. First, a passage which discharges excess supply oil to the outside the housing communicates with an oil supply passage extending from the oil supply opening of the tensioner to the hydraulic valve mechanism. With this configuration, when the oil supplied under pressure from a source such as an oil pump or the like, is excessive, the excess supply oil is discharged without increasing the pressure in the high-pressure oil chamber. Consequently, proper tension is maintained in the chain, and the whistling sounds produced as a result of excessive chain tension are reduced. Secondly, more reliable and smoother travel of the chain are realized by directing excess oil discharged by the tensioner toward the chain as auxiliary lubricating oil. Third, the durability of the tensioner and its associated components such as a tensioner lever, the timing chain and the like, are significantly improved.

We claim:

1. A chain transmission comprising a chain arranged to transmit rotating motion from a driving sprocket to at least one driven sprocket, and a hydraulic tensioner arranged to apply tension to said chain, said tensioner comprising a housing having a plunger-receiving hole, a plunger disposed in said plunger-receiving hole and movable therein in a protruding and retracting direction, said plunger being spring-biased in the protruding direction, and arranged to apply tension to said chain, said plunger and said plunger-receiving hole together defining a high pressure oil chamber, a ratchet locking mechanism comprising a ratchet pawl pivotally supported on said housing and ratchet teeth provided on said plunger and engageable by said pawl, an oil supply opening for receiving oil fed under pressure from a source, an oil supply passage, a hydraulic valve mechanism in fluid communication, through said oil supply passage, with said oil supply opening, for allowing oil to flow into said high-pressure oil chamber but blocking backflow of oil from said high pressure oil chamber through said oil supply passage, wherein the improvement comprises an oil discharge passage, said oil discharge passage providing fluid communication from said oil supply passage to the exterior of said housing, whereby abnormally high tension in said chain, resulting from excessive pressure in said high pressure oil chamber when the supplied oil has a high viscosity, is avoided, and wherein said oil discharge passage is arranged to direct a spout of oil toward said chain.

* * * * *